(12) United States Patent
Diamond

(10) Patent No.: US 11,513,509 B2
(45) Date of Patent: Nov. 29, 2022

(54) REMOTE AUTOMOBILE TELEMATICS CONTROL AND SECURITY

(71) Applicant: Ford Global Technologies, LLC, Dearborn, MI (US)

(72) Inventor: Brendan Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 558 days.

(21) Appl. No.: 16/588,698

(22) Filed: Sep. 30, 2019

(65) Prior Publication Data

US 2021/0096559 A1 Apr. 1, 2021

(51) Int. Cl.
| | |
|---|---|
| G05D 1/00 | (2006.01) |
| B60R 25/24 | (2013.01) |
| H04W 4/021 | (2018.01) |
| H04W 4/44 | (2018.01) |
| H04W 76/10 | (2018.01) |
| H04W 12/03 | (2021.01) |
| B60R 25/04 | (2013.01) |
| B60R 25/02 | (2013.01) |

(52) U.S. Cl.
CPC .......... *G05D 1/0016* (2013.01); *B60R 25/24* (2013.01); *H04W 4/021* (2013.01); *H04W 4/44* (2018.02); *H04W 12/03* (2021.01); *H04W 76/10* (2018.02); *B60R 25/02* (2013.01); *B60R 25/04* (2013.01); *B60R 2325/108* (2013.01); *B60R 2325/205* (2013.01)

(58) Field of Classification Search
CPC ........ G05D 1/00; H04W 12/00; H04W 4/021; H04W 4/44; B60R 25/24
See application file for complete search history.

(56) References Cited

U.S. PATENT DOCUMENTS

| | | | |
|---|---|---|---|
| 8,751,065 B1 * | 6/2014 | Kato | G06F 17/00 340/426.2 |
| 9,032,493 B2 * | 5/2015 | Lortz | H04W 12/08 713/168 |
| 9,688,194 B2 | 6/2017 | MacNeille et al. | |
| 9,767,626 B2 | 9/2017 | Makke et al. | |

(Continued)

OTHER PUBLICATIONS

Embitel, "Technology Behind Telematics Explained: How does a Vehicle Telematics Solution Work?", Embitel, 2019, 8 pages.

*Primary Examiner* — Tan Q Nguyen
(74) *Attorney, Agent, or Firm* — Brandon Hicks; Eversheds Sutherland (US) LLP

(57) ABSTRACT

A disclosed system includes a mobile application operative on a mobile device to receive user selected options for limiting drive access to a vehicle when the user is not physically present with the vehicle but wishes to allow service personnel access and limited drive functions. The disclosed system allows user selection of the options, then generates an instruction set for controlling one or more drive capabilities of the vehicle based at least in part on the user selected options. The system establishes an encrypted channel between the mobile device and a telematics control unit of the vehicle. The system controls drive capabilities of the vehicle via the encrypted channel such that the mobile application user can provide remote access for locking, unlocking, ignition, and further restrict drive functions based on time, date, distance, geo-fence options, and other criteria.

20 Claims, 7 Drawing Sheets

(56) References Cited

U.S. PATENT DOCUMENTS

| | | |
|---|---|---|
| 10,235,154 B2 | 3/2019 | Vangelov |
| 2002/0013815 A1* | 1/2002 | Obradovich .......... H04L 63/102 |
| | | 715/744 |
| 2015/0088339 A1* | 3/2015 | Fisher .................... G16H 40/67 |
| | | 701/2 |
| 2015/0149042 A1* | 5/2015 | Cooper .................. E05F 15/77 |
| | | 701/48 |
| 2017/0096123 A1* | 4/2017 | Gennermann ........ B60R 25/241 |
| 2018/0151011 A1* | 5/2018 | Ichida ...................... G07C 9/25 |

\* cited by examiner

REMOTE AUTOMOBILE TELEMATICS CONTROL AND SECURITY

TECHNICAL FIELD

The present disclosure relates to automotive telematics systems and more particularly a telematics system for remote automobile transfer and transportation security.

BACKGROUND

In situations where a vehicle is to be towed or transported, drivers have limited options for transferring the vehicle into the hands of transportation personnel. In most cases, the driver must wait with the vehicle until the personnel arrive on site to ensure that the vehicle safely changes hands, which may be time consuming and may cause frustration if the transportation personnel cannot arrive within a short time. Leaving the ignition keys inside of the vehicle may present security risks to the vehicle and any personal effects in the vehicle. Moreover, the transportation personnel may be unknown to the driver, and it is often unknown whether they may be trusted to operate the vehicle only for the limited transportation purposes.

A system that allows remote access to vehicle operational controls is described in U.S. Pat. No. 9,767,626 (hereafter, the '626 patent"). The '626 patent discloses a mobile service application linked to a vehicle that may allow a user to command the brakes to be pressed to bleed brake lines during a brake pad replacement, command an engine throttle when diagnosing the engine, and control braking and lights to allow for evaluation of bulbs for replacement. The '626 patent does not provide selectable operation limitations that can limit operation of the vehicle to prescribed uses, time restrictions for the prescribed uses, and control other aspects such as access for specific areas of the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
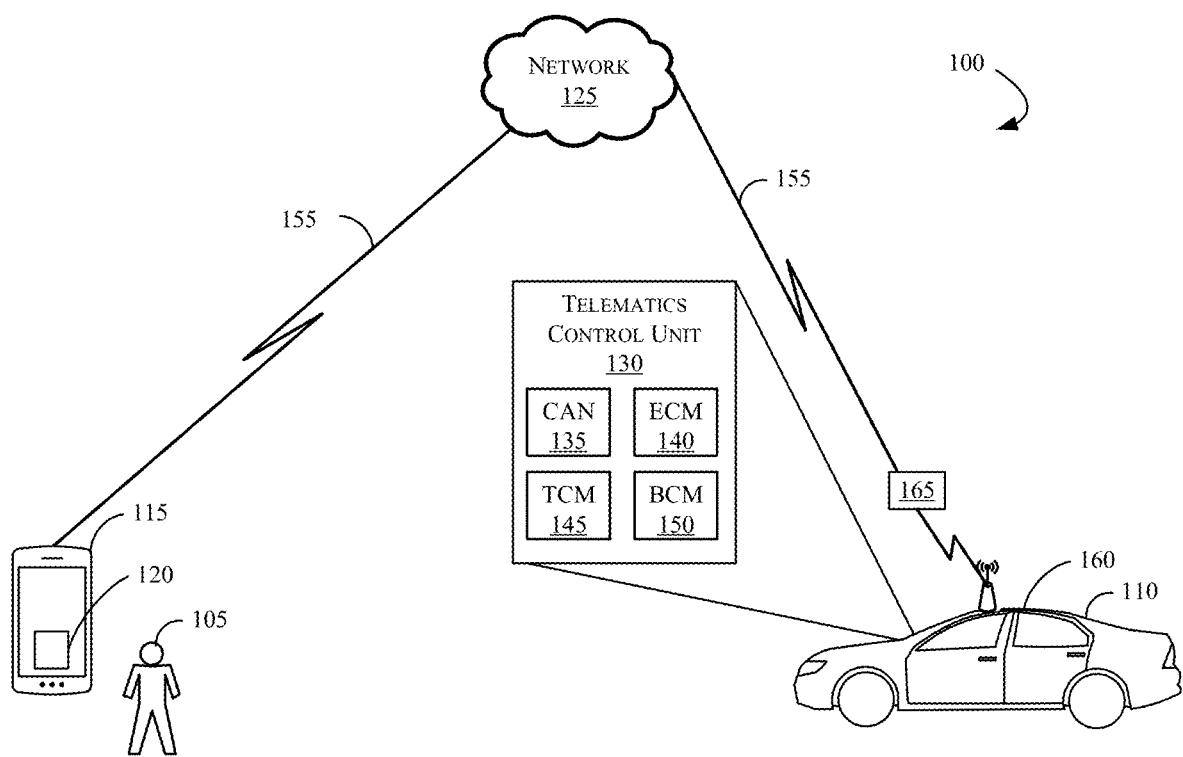
FIG. 1 depicts an example computing environment in which techniques and structures for providing the systems and methods disclosed herein may be implemented.

The systems and methods disclosed herein are configured to provide remote vehicle control with an application that allows a vehicle owner to control whether other people can drive, steer, and/or move the vehicle without the owner being present, and without the keys being in the vehicle. In some embodiments, the owner may provide, by selecting on a user interface of the application, various levels of vehicle control to a third party, who may be a tow truck driver, vehicle transport personnel, mechanic, etc. One level of selectable access may include a "move access" option, which allows the third party to steer the vehicle and put it in neutral to load it onto a tow truck, but prevents other aspects of operation such as engaging the transmission, for example. Another level of access may be a "drive access" option that allows the third party to drive the vehicle up to a defined threshold speed and distance from a specified starting point. Other options may include geographic limitations, access to vehicle locks, time restrictions, and other options.

The implementation may be performed through a Controller Area Network (CAN) connected to the in-vehicle modem, to allow for communication between the vehicle and the phone of the vehicle owner. Once linked with a secure communication channel, the mobile device may communicate with the Engine Control Module (ECM), Transmission Control Module (TCM), and the Body Control Module (BCM), among other onboard control mechanisms. By providing precise control over how the vehicle may be operated, by whom and when, embodiments described herein may increase vehicle security by preventing theft or misuse, and provide peace of mind to vehicle owners that do not wish to physically remain with their vehicles while waiting for transportation personnel to arrive to get their vehicle. These and other advantages of the present disclosure are provided in greater detail herein.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. Alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, words such as "automobile," "vehicle," "car," and "truck" may be used interchangeably and should be understood in the context of the disclosure. Words such as "controls," "signals," "indication," and "information" may also be used interchangeably and should be understood in the context of the disclosure. Furthermore, the word "information" as used herein may refer to various items such as digital data, analog data, audio content, video content, and/or messages. These items may be operated upon by a computer containing a processor. The phrase "pursuit mode of operation" as used herein is not limited to a police vehicle involved in a pursuit and can include other vehicles and operations such as an emergency vehicle (fire truck, ambulance etc.) being driven in response to an emergency. Phrases such as "a signal is transmitted" or "a door being opened" should not be construed exclusively in a singular sense. The phrase should be understood to also encompass "a set of signals" that may be transmitted (concurrently or sequentially) to one door and/or to multiple doors. It should also be understood that the word "example" as used herein is intended to be non-exclusionary and non-limiting in nature. More particularly, the word "exemplary" as used herein indicates one among several examples, and no undue emphasis or preference is being directed to the example being described herein.

FIG. 1 depicts an example computing environment 100 in which a vehicle user 105 has left a vehicle 110 in a location remote from (that is, not proximate to) the user 105. By way of illustration, the vehicle 110 may have had a mechanical issue that renders the vehicle 110 undrivable and in need of vehicle transportation services (e.g., a tow truck or other transport service). In the example of FIG. 1, the user 105 may call a tow truck company, but learns that there will be a two hour wait before transport personnel will be able to arrive at the location of the vehicle. If the user 105 wishes to leave the vehicle 110 for the tow truck driver, the owner would have to leave the keys with the vehicle 110. Using conventional methods, the owner may leave the keys in the ignition or attempt to hide them in the vehicle 110, however there may be a risk of theft and potential liability for leaving the keys in the vehicle. As a result, the user 105 may have to wait by the vehicle 110 for several hours, which may be uncomfortable, time consuming and potentially dangerous if the vehicle has broken down by the side of a busy thoroughfare.

According to an example embodiment, the user 105 may instead use an application 120 operating on a mobile device 115 that uniquely associates the user 105 with the vehicle 110, and provides options that provide limited access and control to a third party (not shown in FIG. 1) when the user 105 is remote from the vehicle 110. In one example, the application 120 may provide limited control of the vehicle to a tow truck driver. Once launched on the mobile device 115 and associated with the vehicle 110, the application 120 may prompt the user 105 for various settings that, when selected and registered in a vehicle control system of the vehicle 110, provide control mechanisms that can limit access to locked areas of the vehicle and restrict various driving features.

For example, the application 120 may provide control limitations, using one or more user interfaces, that the user 105 may select and unselect for locking and unlocking the vehicle 110, controlling speed, gear usage, steering ability, and geographic limits for vehicle use. Various examples of user interface(s) are discussed with respect to FIGS. 3, 4, 5, and 6). In other aspects, the application 120 may control how the tow driver or other personnel may use the vehicle once access is granted, such as, for example, how fast they can drive the vehicle, when they are permitted to operate the vehicle, and whether they have full operation of the vehicle, or have limited operation of the vehicle that limits braking, steering, navigation, etc. The application 120 may control such functions remotely from the mobile device 115 and provide access to locked interior spaces of the vehicle 110 to transport personnel or others. Accordingly, the user 105 may grant access to the vehicle 110 from a secure and comfortable location without the necessity of leaving keys with the vehicle, and/or leaving the vehicle unlocked.

In some aspects, the mobile device 115 may communicate with the vehicle 110 through an encrypted channel 155 established between the mobile device 115 and a telematics control unit 130. The mobile device 115 may communicate with the telematics control unit 130 using a wireless transmitter 160 associated with the telematics control unit 130 on the vehicle 110. The wireless transmitter 160 may communicate with the mobile device 115 using a wireless communication network such as, for example, the network 125. The encrypted channel 155 is shown in FIG. 1 as communicating via a network 125.

The network 125 illustrates an example of one possible communication infrastructure in which the connected devices may communicate. The network 125 may be the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

Figure 2:
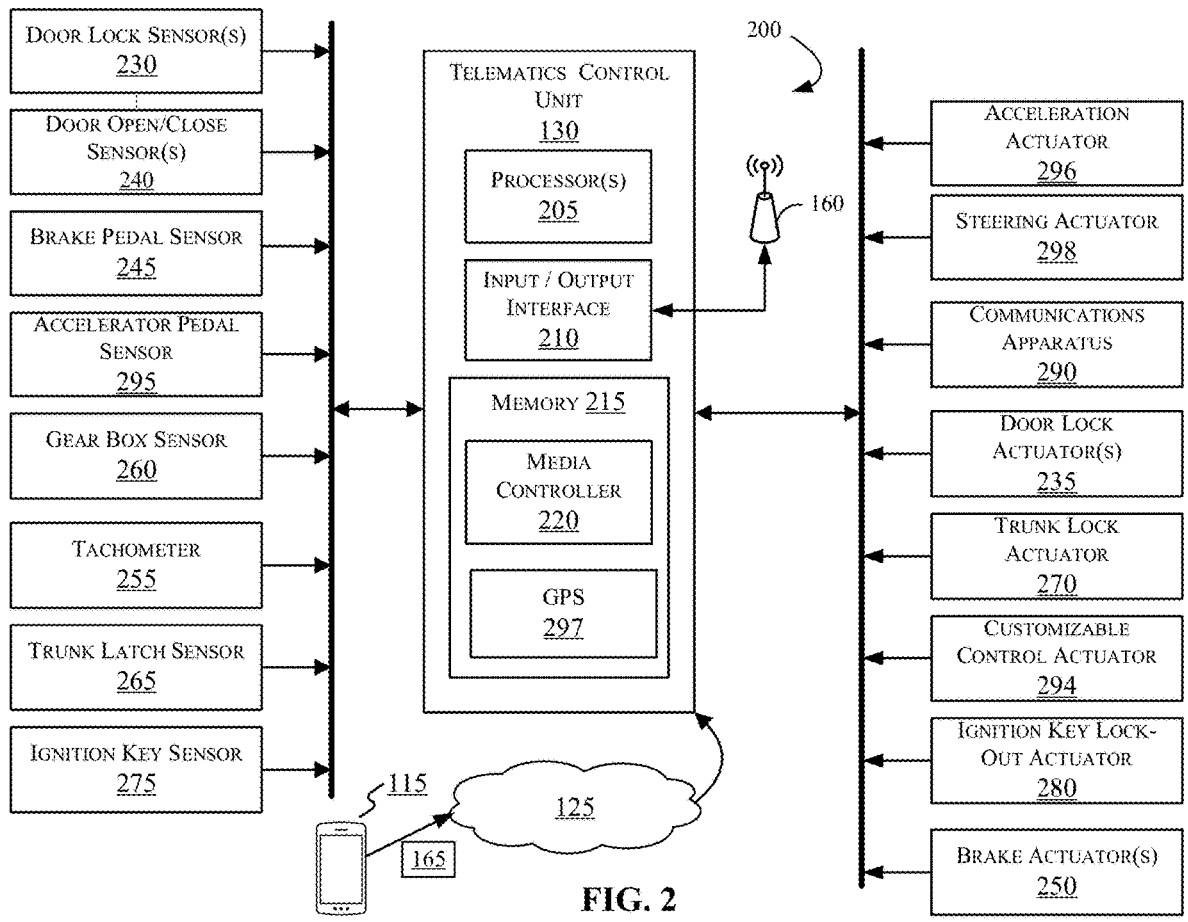
FIG. 2 is a functional schematic of a computing system architecture utilized in accordance with the present disclosure.

The telematics control unit 130, discussed in greater detail with respect to FIG. 2, can include communication and control access to a plurality of vehicle computing modules such as, for example, a Controller Area Network (CAN) bus 135, one or more Engine Control Modules (ECMs) 140, a Transmission Control Module (TCM) 145, and/or a Body Control Module (BCM) 150. Control and/or communication with other control modules not shown is possible, and such control is contemplated. In some aspects, the telematics control unit 130 may control aspects of the vehicle 110 through the control modules 135-150 and implement one or more instruction sets 165 received from the application 120 operating on the mobile device 115.

FIG. 2 illustrates a functional schematic of a computing system architecture 200. The computing system architecture 200 is shown having a telematics control unit 130. The telematics control unit 130 may include, in one example, one or more processor(s) 205, an Input/Output (I/O) interface 210, and a computer-readable memory 215. The memory 215 may include a media controller 220, and a global positioning system (GPS) 297, among other software. For example, the telematics control unit 130 may generally include an operating system, although one is not shown in FIG. 2. For the sake of simplicity, the computing system architecture 200 may also omit certain computing architectures and controlling modules, such as the CAN 135, the ECM 140, the TCM 145, and the BCM 150. It should be readily understood that the computing environment 100 and the computing architecture 200 depicted in FIGS. 1 and 2, respectively, are examples of possible implementations according to the present disclosure, and thus, are not to be considered limiting or exclusive.

The telematics control unit 130 may utilize the memory 215 to store programs in code and/or to store data for performing various vehicle bailout operations in accordance with the disclosure. The memory 215 is a non-transitory computer-readable memory. The processor(s) 205 may be configured to execute computer-executable instructions stored in the memory 215 for performing various functions of the telematics control unit 130 as well as for performing vehicle control capabilities in accordance with the disclosure. Consequently, the memory 215 may be used for storing code and/or data code and/or data for performing operations in accordance with the disclosure. The memory 215 may store various code modules such as, for example, a secure communication controller (not shown in FIG. 2) for establishing encrypted channel(s) between the mobile device 115 and the vehicle telematics system 130. The memory 215 may also receive the one or more instruction sets 165 for programming the vehicle telematics control unit 130 onboard the vehicle 110.

The I/O interface 210 may be configured to receive signals from various sources such as sensors and transducers provided in the vehicle 110. A few such exemplary sensors are shown in FIG. 2. For example, the I/O interface 210 may receive status information (not shown in FIG. 2) from one or more door lock sensor(s) 230 disposed in one or more doors (not shown in FIG. 2) of the vehicle 110. The status information may include an indication whether a door is locked or unlocked. The processor(s) 205 may reference the status information to determine whether a lock instruction or unlock instruction is to be issued for activating one or more door lock actuators 235. For example, the processor(s) 205 may activate the door lock actuators 235 in order to lock one or more doors and secure the contents of the vehicle 110 based at least in part on the instruction set(s) 165, which may include a lock command issued via the mobile device 115. In other aspects, the instruction set(s) 165 may instruct the door lock actuators 235 to unlock a door at a predetermined time, lock a door after a certain predetermined time, lock or unlock a door after particular user-selected events, and/or actuate according to other rules. In other example embodiments, the instruction set(s) 165 may instruct the door lock actuators 235 to unlock or lock based on a custom command, such as an actuation command sent from the mobile device 115.

One or more door open/close sensor(s) 240 may be disposed in one or more doors (not shown in FIG. 2) of the vehicle 110. Accordingly, the I/O interface 210 may receive a signal indicative of whether one or more doors of the vehicle 110 have been opened or closed. The processor(s) 205 may use the status information to generate one or more control signal(s) for activating one or more door lock actuators 235. The processor(s) 205 may activate the door lock actuators 235 based on a command from the application 120 operative on the mobile device 115. For example, a user may wish to secure the contents of the vehicle 110 when the user 105 has left the vehicle 110 for some third party (e.g., towing personnel), or for any other reason. In one embodiment, the door open/close sensor(s) 240 may indicate whether an unlock command has successfully executed, such that the doors were opened by the third party as intended.

The I/O interface 210 may receive from the tachometer 255 data about the speed of the vehicle 110. For, example, the processor(s) 205 may retrieve one or more signals from the tachometer to analyze vehicle speed characteristics, to determine whether the vehicle 110 is operating within limits set forth in the instruction set(s) 165. For example, the I/O interface 210 may receive an indication from the brake pedal sensor 245 whether the brake pedal (not shown in FIG. 2) has been depressed and/or may indicate an extent of depression. The I/O interface 210 may also receive, from an accelerator pedal sensor 295, an indication whether the accelerator has been depressed and/or signals an indication of the extent of depression of the accelerator.

For example, the instruction set may indicate that the vehicle is speed limited to a predetermined speed (e.g., 5 miles per hour). Accordingly, the processor(s) 205 may receive a signal from a tachometer 255 indicative of vehicle speed and determine if the signal from the tachometer 255 is within a predetermined range of allowed speed (based on the instruction set(s) 165). The processor(s) 205 may transmit a command to the brake actuator(s) 250 responsive to determining that the vehicle 110 is operating outside of the prescribed limit in the instruction set. Stated another way, the processor(s) may evaluate a signal response from the tachometer 255 indicative of speed, compare the speed to a predetermined range of values associated with allowable operation, and issue one or more control commands to the brake actuator(s) 250 responsive to the comparison.

The I/O interface 210 may also receive gear engagement data indicative of a gear engagement from the gear box sensor 260. In one embodiment, the processor(s) 205 may obtain the gear engagement data at any instant in time. For, example, the signal may indicate that a low gear is being used over a first time and a high gear is being used during a second period. The processor(s) 205 may use the signal received from the gear box sensor 260 either individually, or in combination with signals received from the brake pedal sensor 245 and/or the accelerator pedal sensor 295, to determine whether the vehicle 110 is operating within rules set forth in the instruction set(s) 165. For example, the user 105 may instruct, through the application 120, that the vehicle 110 is to remain in low gear only while being operated by the towing personnel. Accordingly, the gear box sensor 260 may provide an indication of a current gear engagement. The processor(s) 205 may disengage a gear, apply braking power using the brake actuator(s) 250, and/or perform other acts based in part on the instruction set and sensor data from the gear box sensor 260.

Figure 5:
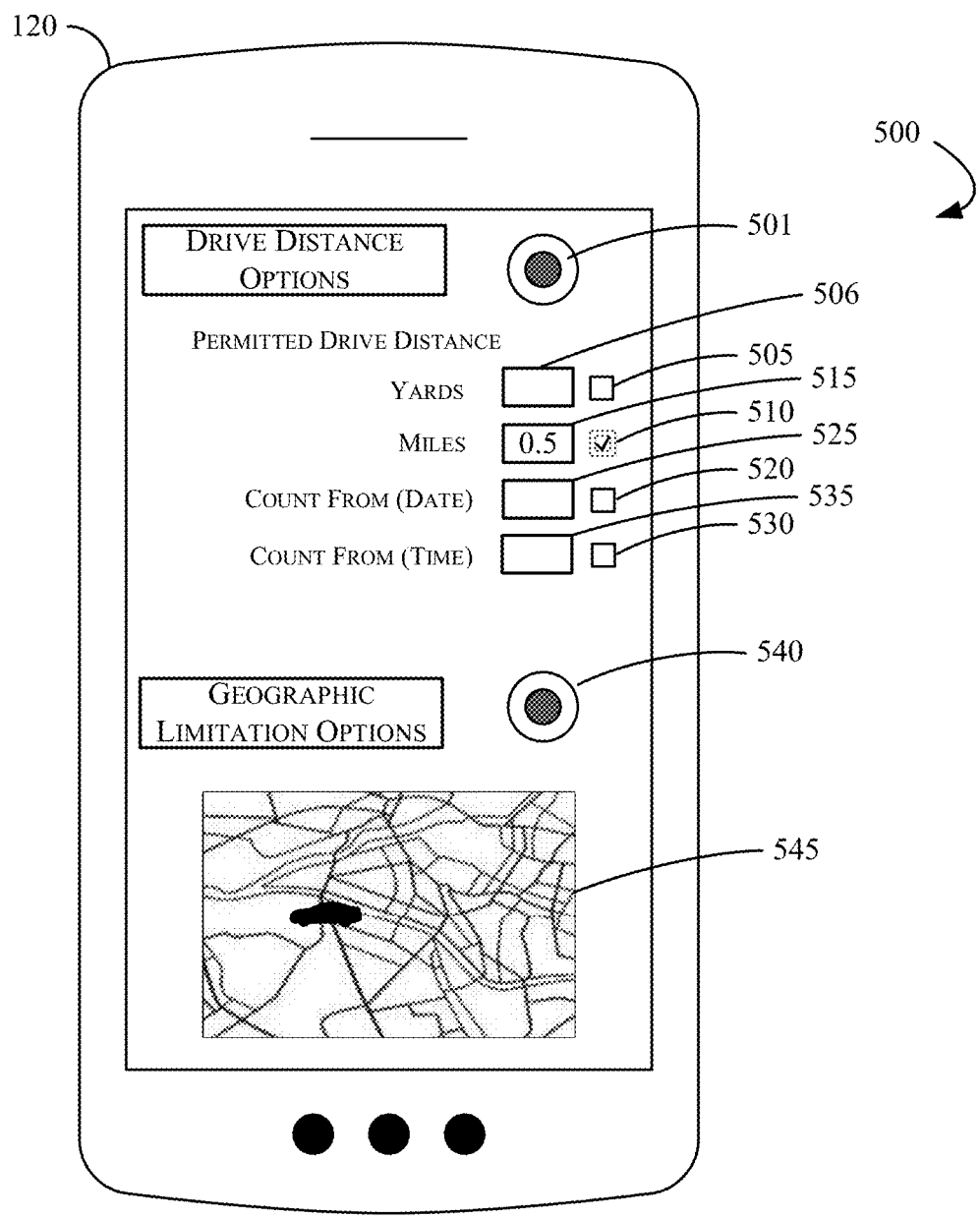
Figure 6:
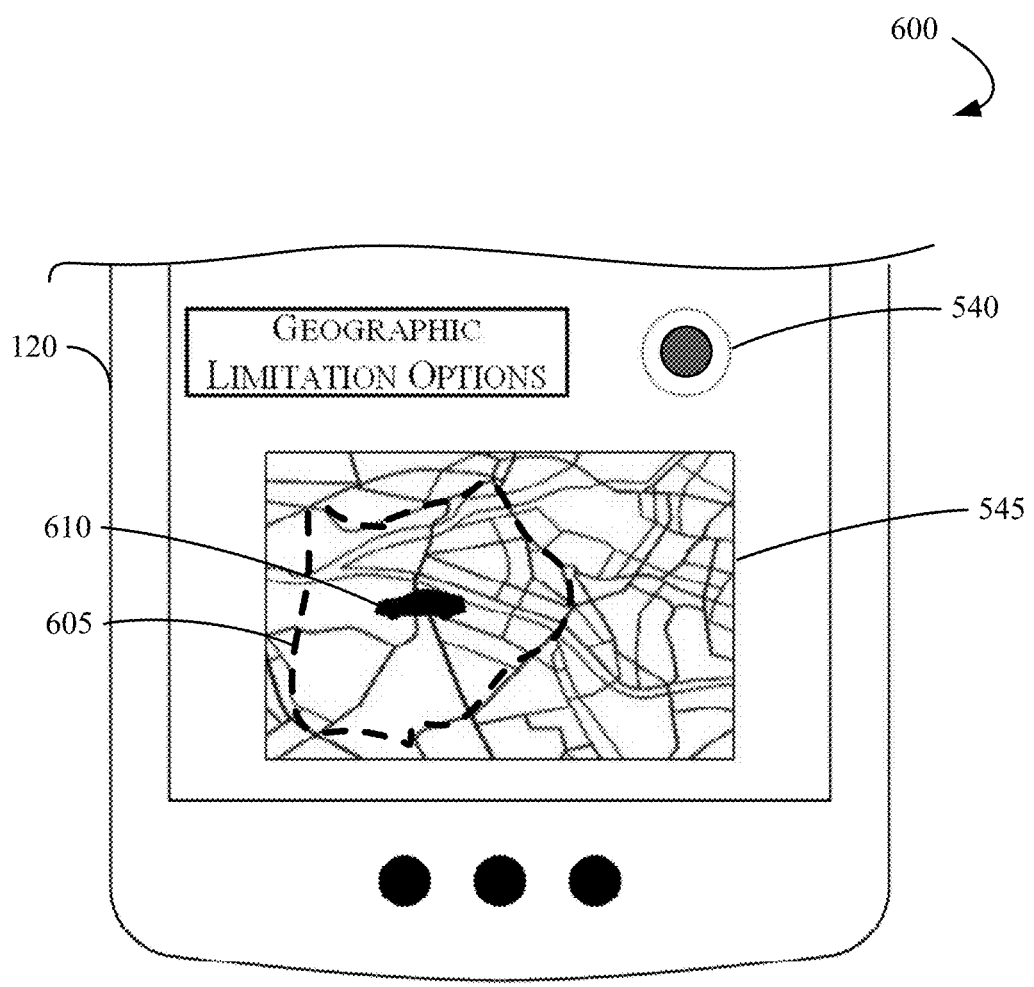

The telematics control unit 130 may also be configured with the global positioning system (GPS) system 297. In one example embodiment, the processor(s) 205 may obtain GPS coordinates (not shown in FIG. 2) associated with a current position (or approximately current position) of the vehicle 110, and determine whether the vehicle is operating according to one or more rules set by the application 120 in response to user selected options. The one or more rules may establish the set of GPS coordinates associated with (and/or defining) a geographic boundary within which the vehicle 110 may be driven. FIGS. 5 and 6, discussed hereafter, explain one such embodiment. In some aspects, the processor(s) 205 may control a drive function responsive to determining that the GPS coordinates associated with the current position are not within the defined boundary. Stated in mathematical terms, the set of GPS coordinates forming the boundary may form a set, where all coordinates internal to that boundary are implied and part of the set. The processor(s) 205 may determine whether the coordinates associated with the present position of the vehicle 110 are a member of the set of coordinates associated with the geographic region in which the vehicle may be driven. When the current position is not associated with coordinates that are part of the set, the vehicle is not operating within the allowable limits of the geo-fence. As used herein, a geo-fence may be indicative of a virtual geographic boundary, defined by GPS or radio-frequency identification (RFID)

technology, that enables the application 120 to trigger a notification when the vehicle 110 enters or leaves an area.

In such an example, the processor(s) 205 may issue one or more commands for controlling the drive function, including, for example, setting a maximum drive speed to a particular gear configuration (e.g., "Low Gear"), disabling the ignition using the ignition key lock-out actuator 280, etc.

The I/O interface 210 may receive, from the trunk latch sensor 265, an indication whether the trunk of the vehicle 110 is locked or unlocked. The indication may be used by the processor(s) 205 to issue one or more instructions for activating a trunk lock actuator 270 such that a trunk hatch of the vehicle 110 may be opened or closed by a party given access. In other aspects, the driver 105 may instruct through the application 120 that the towing personnel be given access to the trunk if needed, to access a spare tire, or perform some other duty. Accordingly, the processor(s) 205 may instruct the trunk lock actuator 270 to unlock the trunk.

The I/O interface 210 may receive, from the ignition key sensor 275, an indication whether a car key has been left in a starter mechanism of the vehicle 110. The processor(s) 205 may carry out various operations based at least in part on the car key position information, such as, for example, enabling or disabling the ignition key lock-out actuator 280, which may secure the vehicle 110 after the driver has left the vehicle.

In other aspects, the ignition key sensor 275 may indicate whether authorized or unauthorized personnel have started the vehicle 110. In one example, the processor(s) 205 may instruct an ignition key lock-out actuator 280 to disengage an engine of the vehicle 110 responsive to determining that an unauthorized start has occurred. Disengaging the lock-out actuator 280 may disable the vehicle 110. In other aspects, the ignition key lock-out actuator 280 may disengage the engine responsive to other factors such as, for example, time, geographic location, distance, speed, etc.

The telematics control unit 130 may also be communicatively coupled to and/or include the vehicle media controller 220. Some examples, the vehicle media controller 220 can include an infotainment system mounted on a dashboard of the vehicle 110, a radio communications device mounted in the vehicle 110, a personal device such as a smartphone carried by the driver or another occupant of the vehicle 110, a computer installed in the vehicle 110, and/or a portable computing device such as a tablet computer. The vehicle media controller 220 may be used to inform an occupant of the vehicle of one or more limitations set in the instruction set(s) 165. For example, the processor(s) 205 may cause the media controller 220 to generate an output indicative of a speed limit, a steering rule such as only steering changes of 30 degrees or less may be allowed, a time restriction for operating the vehicle, a geographic limitation such as a geo-fence implemented by the instruction set(s) 165, one or more drive distance options, etc.

In another example, the media controller 220 may provide two-way communication with an occupant of the vehicle 110 and the vehicle owner 105 through the application 120. For example, the wireless transmitter 160 may be operatively connected with a telecommunications network (e.g., the network 125), and may provide video chat services using the media controller and a communications apparatus 290. In some aspects, the communications apparatus 290 may include a camera and one or more output devices (e.g., a screen, a microphone, a speaker, etc.). In another example embodiment, the processor(s) 205 may establish the secure channel 155 (as shown in FIG. 1), which may include video chat capabilities between an interior camera (not shown in FIG. 1) of the vehicle 110, and a camera (not shown in FIG. 1) integrated with the mobile device 115. The video chat may provide visual and other indications that may be used by the processor(s) 205 and/or the user 105 whether the user 105 may grant operational and other access to the vehicle 110 to third parties requesting access to the vehicle, and may provide visual and audio monitoring of the vehicle in real time if such monitoring is desired by the user 105.

In another embodiment, the media controller 220 may record visual and audio showing the interior of the vehicle 110, and may provide short term (e.g., one day, one week, etc.,) and/or long term (e.g., one year, etc.) data persistence of the video feed in a local computer memory (e.g., the memory 215) and/or a remote memory storage device (not shown). The video recording may provide a point of reference for determining whether the service personnel used the vehicle 110 in ways consistent with the agreed service, repair, transport, or other task at hand, and/or whether the service accessed or attempted to access any unauthorized areas of the vehicle.

In another embodiment, the media controller 220 may save an image of the assigned personnel in the computer memory 215 and may obtain an image of the personnel attempting to access the vehicle such that the images can be compared by an identity utility of the user 105. The media controller 220 may obtain the image using one or more exterior cameras (not shown), and/or one or more interior cameras (not shown) and save the image to the memory 215.

In another aspect, the user 105 may provide access to the vehicle 110 responsive to a positive identification of the personnel. For example, once third-party services (towing, repair, etc.) are requested and agreed upon by the user 105, the service personnel assigned the task by the third party company performing the services may provide a photograph, passcode, digital key, or other identifying data to the application 120. The vehicle owner 105 may register the identifying data using the application 120 via the mobile device 115, which may register the identifying data with the telematics control unit 130. In an example implementation, the identifying data associated with the assigned personnel may provide a point of comparison with which the user 105, or computer identification system (not shown), may authenticate and/or otherwise identify the worker as he/she approaches the vehicle and attempts access. In one aspect, the processor(s) 205 may (using an identity verification module, not described but understood in the art of identity verification) compare the identifying data received from the service entity with a public key, and/or present the provided photo alongside an image of the personnel obtained at the vehicle to a user interface of the application 120 (not shown) such that the user 105 may provide access after visual inspection of the two images and verification of the personnel on-site. In another aspect, the processor(s) 205 may cause the lock actuators 235 to lock the doors or perform other protective acts responsive to determining that the occupant is unauthorized.

Figure 3:
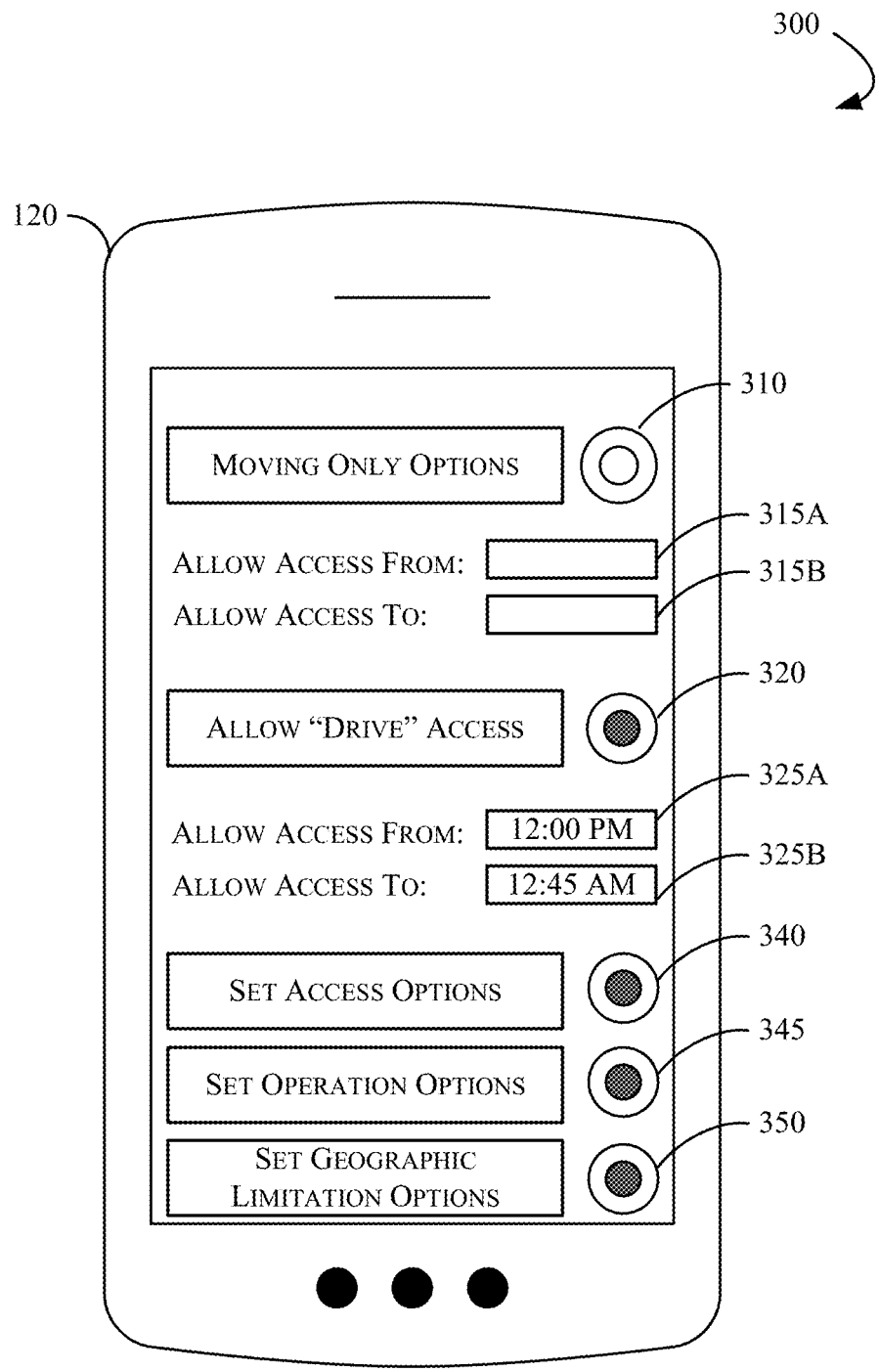
FIGS. 3-6 depict an example user interface in accordance with the present disclosure.

FIG. 3 depicts an example user interface 300 that may be operable using the mobile device 115, in accordance with embodiments described herein. The user interface 300 may provide a plurality of control mechanisms that allow the user 105 to define options for limiting drive access to the vehicle 110. For example, the drive capabilities may include precise vehicle access control for locking and unlocking the vehicle and provide operational control that limits use of the vehicle used based on time, dates, location, and other options.

The user interface 300 may include user-selectable options that control pre-set configurations. For example, the user interface 300 may include a moving only option selection button 310, that when selected, may provide one or more time-related control fields that allow the user 105 to enter time frames within which the vehicle may be operated or accessed. For example, a starting time for access field 315A and an ending time for access field 315B may provide means for specifying a starting time that access is granted (315A) and an ending time for that access (315B). Accordingly, the vehicle may be accessed by third party personnel only during the provided time window in 315A and 315B. In other aspects, the moving only options selection button 310 may enable controls that allow only limited functionality for vehicle movement. For example, if the moving only option selection 310 is enabled (FIG. 3 depicts the button 310 as disabled), the application 120 may set predetermined constraints for operation of the vehicle 110, such as, for example, to only allow a drive gear to change from a park position to a neutral position, which may allow rolling of the vehicle onto a platform of a tow vehicle. In another embodiment, selection of the moving only option selection 310 may allow only a predetermined amount of steering control (e.g., +30 degrees and −3 degrees of steering control from a forward steering position), or other possible options. Although the entry fields associated with steering control are not shown in FIG. 3, it should be appreciated that such fields may be enabled and are contemplated in example embodiments.

In other aspects, the user interface 300 may provide a selectable Allow "Drive" Access button 320. When selected (as depicted in FIG. 3), the selectable Allow "Drive" Access button 320 may enable fields 325A and 325B, which may enable entry of a starting time from which the vehicle may be driven, 325A, and an ending time after which the vehicle may not be driven, 325B. A customizable control actuator 294 may provide control and/or actuation for equipment defined by a user. For example, a custom radio actuator, a beverage cooler, etc. may be controllable using the customizable control actuator 294.

In other aspects, the user interface 300 may provide a selectable Set Access Options button 340. When selected (as depicted in FIG. 3), the selectable Set Access Options may enable additional options for vehicle access, as further described in FIG. 4.

In other aspects, the user interface 300 may provide a selectable Set Operation Options button 345. Selection of the Set Operation Options button 345 may enable pre-set and/or predetermined settings for drive control such as a predetermined speed limits and/or drive distance limits that prevent joy riding or other unauthorized usage. Other features are possible, and are contemplated.

The user interface 300 may provide a selectable Set Geographic Limitations button 350, which may be selectable to access one or more other user interfaces that enable entry of one or more geographic limitation options 350. Example interfaces are depicted with respect to FIGS. 5 and 6.

Figure 4:
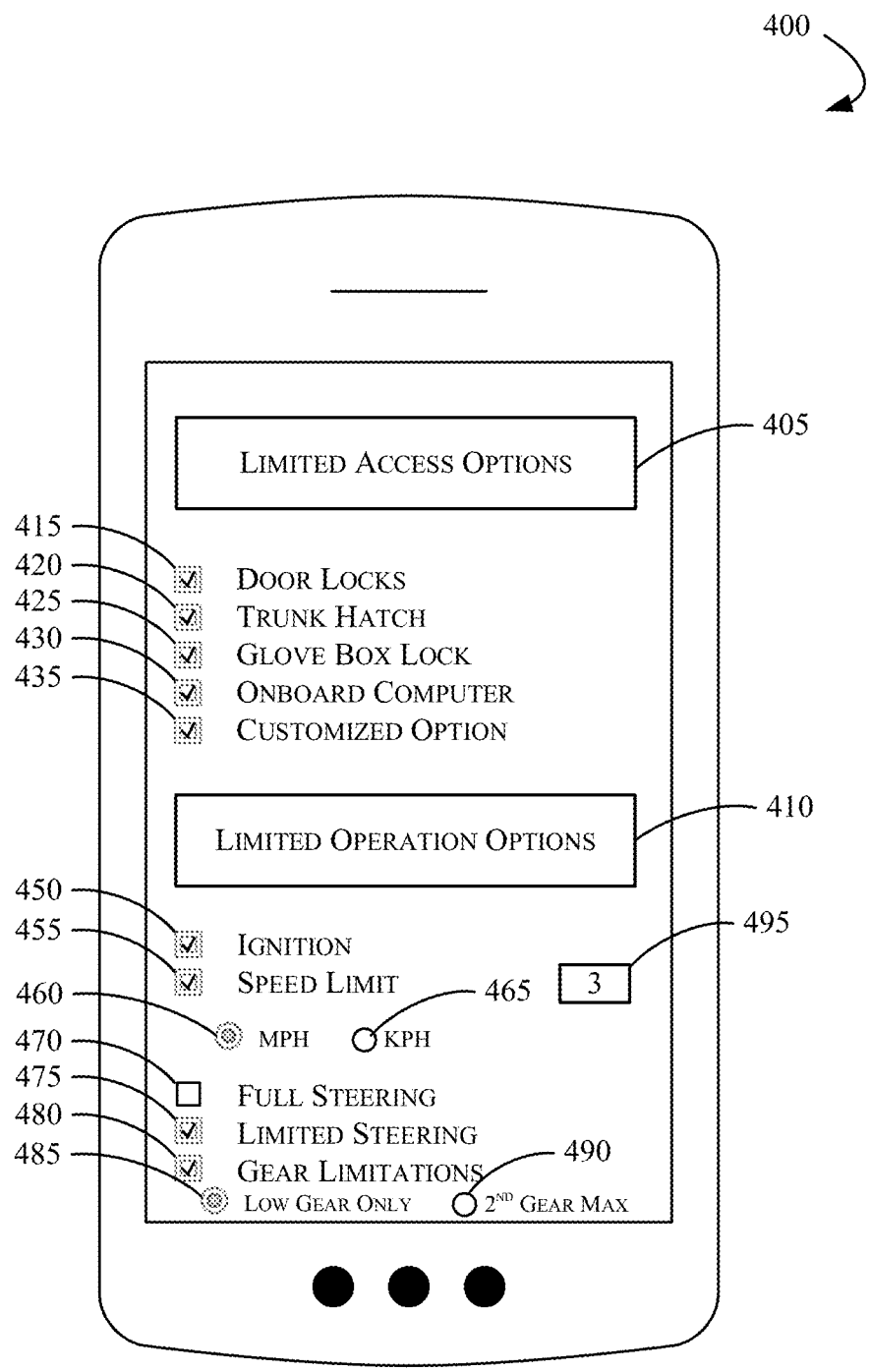

FIG. 4 depicts another example user interface 400 that may be operable using the mobile device 115, in accordance with embodiments described herein. Using the interface 400, the application 120 may obtain one or more user-selected options for limiting drive access 405 to the vehicle 110. For example, with reference again to FIG. 3, selection of the Set Access Options button 340 may cause a processor of the mobile device (not shown in FIG. 4) to present a plurality of selectable options using the user interface 400. For example, the user interface 400 may enable selectability of checkboxes 415, 420, 425, 430, and 435, for controlling points of vehicle access. For example, when selected, the door locks checkbox 415 may allow access (when selected) to the door lock actuators such that a user may lock and unlock the mechanisms. A trunk hatch checkbox 420 may allow access to the trunk hatch mechanisms onboard the vehicle 110. A glove box lock checkbox 425 may allow access to the glove box latch mechanism in the cab of the vehicle 110. An onboard computer checkbox 430 may enable control of the media controller 220 or another computing component. A customized option checkbox 435 may provide a customizable control for the user 105 to provide and/or disallow access to a connected device, which may be selected and configured by a user. Other options are possible, and are contemplated.

Referring again to FIG. 3, selection of the set Operation Options button 345 may provide means for obtaining one or more user selectable options for controlling operational aspects of the vehicle 110. For example, selection of the Set Operation Options button 345 may enable the limited operation options section 410 for entry of one or more user selections of an ignition checkbox 450, which may allow or disallow engagement of the vehicle ignition system using the ignition key sensor 275 and/or the ignition key lockout actuator 280. A speed limit checkbox 455 may enable entry of a speed limit value. The application 120 may generate a set of rules that limit speed based at least in part on the user selection(s). In one embodiment, a speed entry field 495 provides means for the user 105 to enter a numeric value for speed limit, and radio buttons for units (e.g., miles per hour (MPH) button 460 and a kilometer per hour (KPH) button 465). A full steering selectable checkbox 470 and a limited steering selectable checkbox 475 may provide instructions to the telematics control unit 130 that indicate whether the vehicle 110 may be steered freely (checkbox 470 is selected), or whether steering limitations are enabled (checkbox 475 is selected). A field (not shown in FIG. 4) may provide means for entering limits for steering angles allowed by the telematics control unit 130. A selectable gear limitations checkbox 480 may provide options to limit vehicle gearbox usage using the gearbox sensor 260 and the TCM 145. A selectable Low Gear Only button 485 and a selectable $2^{nd}$ Gear Max (maximum) button 490 are also shown as possible options. Other options are possible, and contemplated.

Referring briefly to FIG. 3, the Set Geographic Limitation Options button 350 may provide, when selected, means for setting one or more user selected options for limiting drive access based on geographic limits. With reference now to FIG. 5, this figure depicts a user interface 500 with which a user (the user 105 for example) may select geographic limitation options for operating the vehicle 110. For example, a Drive Distance Options button 501 may be selectable to enable a plurality of driving distance restriction settings. Example settings may include, for example, a check box 505 that may enable entry of a permitted drive distance in yards, and a field for data entry of the drive distance. If enabled, the field for permitted drive distance 506 may indicate the total distance permitted for driving in yards. A checkbox 510 for miles is shown as a selected option. By selecting the checkbox 510, a field 515 is enabled in which a numeric value for miles permitted to drive the vehicle may be entered. As shown, a user has entered a limit of 0.5 miles.

In other aspects, distances may be counted after a particular date, such as, for example, after a one-day maneuvering period where distances are not calculated by the system, but after which the processor(s) 205 may keep track of total distance driven and disable the vehicle once the defined distance has been reached. A count from (Date) checkbox 520 may provide a field 525 for entry of a date, if enabled by selection. A count from (Time) checkbox 530 may provide access to a count from (Time) entry field 535 when the checkbox is selected. Accordingly, a value for a time may be entered in the field to indicate a time to begin counting drive distances for the purpose of limiting distance.

The Geographic Limitations Options button 540 may provide a user-selectable map area 545 for user-selected geo-fencing that controls the bounds from within which the vehicle 110 may be operated by a third party. For example, the user interface 500 may output a graphic for the map area 545 indicative of a geographic region proximate to the vehicle 110. Accordingly, the application 120 may access an approximate or exact location of the vehicle 110, and generate the user-selectable map area 545 based on the determined geographic location of the vehicle 110.

FIG. 6 illustrates an expanded view 600 of the map area 545 as shown in FIG. 5. Referring now to FIG. 6, when the Geographic Limitation Options button 540 is depicted as enabled (e.g., selected), a graphic output of a user-selectable map area 545 may present a user selectable field for indicating a geo-fence. For example, using a finger or other means of entry, a user (e.g., the user 105) may create a user-selected geo-fence indication 605 that visually describes a geographic limit. The geo-fence indication 605 may establish an outer limit for operating the vehicle 110. An icon 610 may provide an indication of a current location of the vehicle 110, and may provide real-time GPS locating services to the user 105. In some example embodiments, the telematics control unit 130 may disable the vehicle 110 responsive to determining that the vehicle 110 has exited the geographic region associated with the user-selected geo-fence indication 605.

After selecting one or more of the options for operational control and access, the application 120 may generate the one or more instruction set(s) 165, where the instruction sets provide instructions controlling the one or more drive capabilities of the vehicle 110 via the encrypted channel, wherein the instruction set causes the vehicle telematics control unit to change the one or more drive capabilities, wherein the drive capabilities are associated with one or more of a time limitation, a distance limitation, and a speed limitation.

Figure 7:
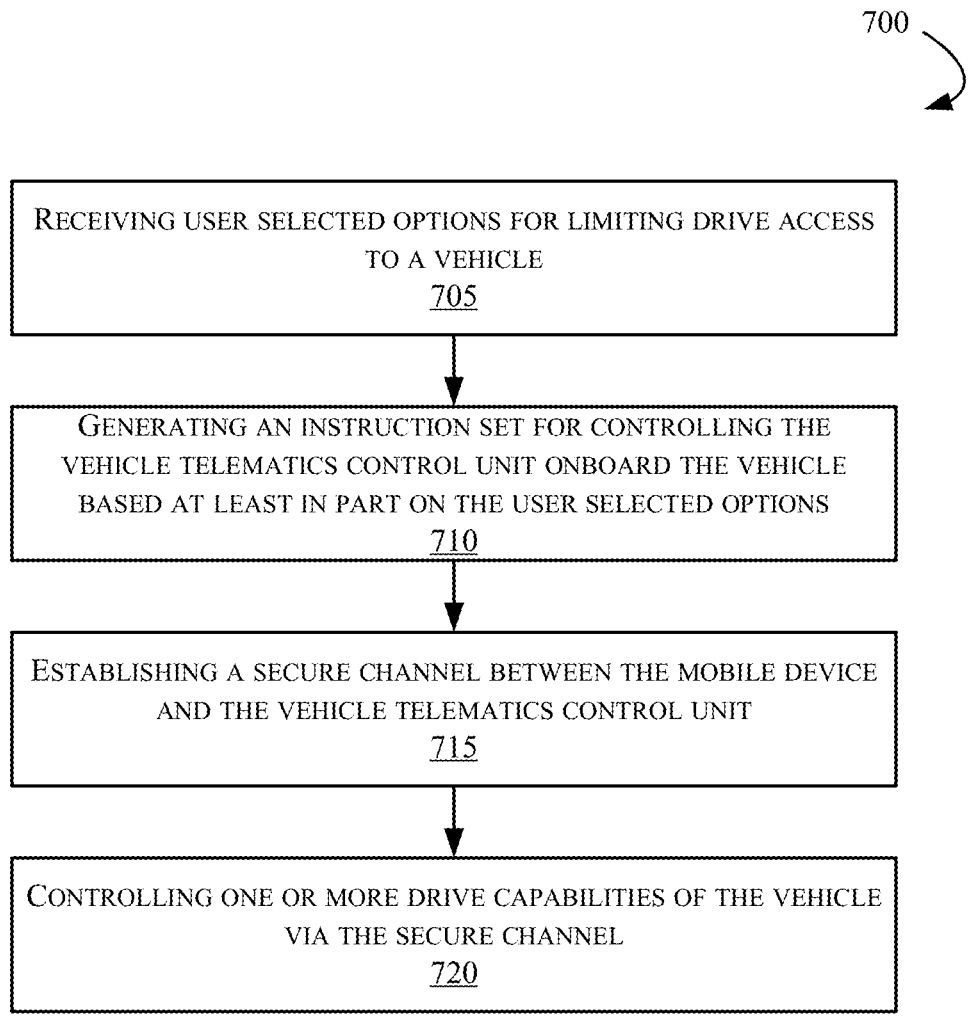
FIG. 7 is a flowchart of an example method of the present disclosure.

FIG. 7 is a flowchart of an example method 700 of the present disclosure. The method 700 generally includes a first step 705 of receiving, via a user interface of a mobile device, user selected options for limiting drive access to a vehicle. In some aspects, the mobile device 115 may provide the driving access from a location remote from the vehicle 110.

The method may generally include a second step 710 that includes generating an instruction set for controlling the vehicle telematics control unit 130 onboard the vehicle 110 based at least in part on the user selected options.

The method may further include a third step 715 that includes establishing a secure (encrypted) channel 155 between the mobile device 115 and the vehicle telematics control unit 130.

The method may also include a step 720 that comprises controlling one or more drive capabilities of the vehicle 110 via the encrypted channel 155. In some aspects, the instruction set(s) 165 may cause the vehicle telematics control unit 130 to change one or more drive capabilities of the vehicle 110. In an example embodiment, controlling the one or more drive capabilities of the vehicle 110 can include locking and unlocking one or more vehicle lock mechanisms (not shown in FIG. 7) using the one or more door lock actuator(s) 235.

In another example embodiment, the lock mechanisms may include an ignition key lock-out actuator 280, a trunk lock actuator 270, and one or more door lock actuator(s) 235. In another aspect, the instruction set 165 may include instructions for controlling one or more of an acceleration actuator 296 and a steering actuator 298.

As noted above, in some embodiments, remote vehicle access is provided using a mobile device application that creates an encrypted connection with a vehicle telematics controller to set limits and rules for controlling the vehicle remotely, and for setting restrictions that limit how the vehicle may be used by third parties.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether explicitly described.

Computing devices may include computer-executable instructions, where the instructions may be executable by one or more computing devices such as those listed above. Computer programs may compile or interpret computer-executable instructions using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media.

Databases, data repositories or other data stores described herein may include various kinds of mechanisms for storing, accessing, and retrieving various kinds of data. Example mechanisms for storage may include a hierarchical database, a set of files in a file system, an application database in a proprietary format, a relational database management system (RDBMS), etc. The data stores may also include one or more computing devices, and an operating system such as one of those mentioned above.

In some examples, system elements may be implemented as computer-readable instructions (e.g., software) on one or more computing devices (e.g., servers, personal computers, etc.), and stored on computer-readable media associated therewith (e.g., disks, memories, etc.). A computer program product may comprise such instructions stored on computer-readable media for carrying out the functions described herein.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telecommunication devices, and the like.

The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be in both the local and remote memory storage devices.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, the application is capable of modification and variation.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to system components. As one skilled in the art will appreciate, components may be referred to by different names. This document does not intend to distinguish between components that differ in name, but not function.

It should be noted that the sensor embodiments discussed herein can include computer hardware, software, or any combination thereof to perform at least a portion of their functions. In one or more non-limiting examples described herein, a sensor may include computer code configured for execution in one or more processors and may include hardware logic/electrical circuitry controlled by the computer code.

While various embodiments of the present disclosure have been described above, the foregoing description has been presented for the purposes of illustration and description. It is not intended to be exhaustive or to limit the present disclosure to the precise form disclosed. Any or all the alternate implementations may be used in any combination desired to form additional hybrid implementations of the present disclosure. For example, any of the functionality described with respect to a device or component may be performed by another device or component.

All terms used in the claims are intended to be given their ordinary meanings as understood by those knowledgeable in the technologies described herein unless an explicit indication to the contrary is made herein. Use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
   receiving, via a user interface of a mobile device, user selected options for limiting drive access to a vehicle;
   generating, based at least in part on the user selected options, an instruction set for controlling one or more drive capabilities of the vehicle;
   establishing an encrypted channel between the mobile device and a vehicle telematics control unit; and
   controlling the one or more drive capabilities of the vehicle via the encrypted channel, wherein the instruction set causes the vehicle telematics control unit to change the one or more drive capabilities, wherein the drive capabilities are associated with a time limitation, a distance limitation, a steering limitation and a speed limitation.

2. The method according to claim 1, wherein the mobile device provides the driving access to the vehicle from a location remote from the vehicle.

3. The method according to claim 1, wherein controlling the one or more drive capabilities of the vehicle comprises locking and unlocking one or more vehicle lock mechanisms via the vehicle telematics control unit.

4. The method according to claim 3, wherein the vehicle lock mechanisms comprise an ignition key lock-out actuator, a trunk lock actuator, and a door lock actuator.

5. The method according to claim 1, wherein the instruction set comprises control rules for controlling one or more of an acceleration actuator and a steering actuator, wherein the control rules limit a speed at which the vehicle is capable of being driven and a distance over which the vehicle is capable of being driven.

6. The method according to claim 1, wherein receiving the user selected options for limiting drive access to the vehicle comprises:
   presenting one or more selectable access options of a plurality of selectable access options via a user interface, the plurality of selectable access options comprising:
   a door lock control option;
   a trunk hatch control option;
   a glove box lock control option; and
   an onboard computer control access option; and
   receiving user input data associated with a selected one of the one or more selectable access options.

7. The method of claim 1, wherein receiving the user selected options for limiting drive access to the vehicle comprises:
  presenting a plurality of selectable drive capability options to a user via a user interface, the plurality of selectable drive capability options comprising:
    an ignition control option;
    a speed limitation option;
    a steering control option; and
    a gear limitation option; and
  receiving data associated with user selection of the one or more drive capability options.

8. The method according to claim 1, wherein the instruction set causes the vehicle telematics control unit to limit a driving distance permitted during a predetermined time frame.

9. The method according to claim 1, wherein receiving the user selected options for limiting drive access comprises:
  outputting a map of a geographic region on the user interface of the mobile device; and
  receiving a user input indicative of a user-selected geo-fenced area, wherein the geo-fenced area establishes an outer limit for operating the vehicle.

10. The method according to claim 9, further comprising generating instructions for limiting driving of the vehicle to operation within the geo-fenced area based on the instruction set, wherein the instructions for limiting driving causes the vehicle telematics control unit to perform one or more acts comprising:
  disabling an ignition key lock-out actuator;
  disabling an acceleration actuator; and
  disabling a door lock actuator.

11. A system, comprising:
  one or more actuators for controlling operation of a vehicle; and
  a telematics control unit comprising a processor configured to:
    establish an encrypted wireless channel between a mobile device and the telematics control unit;
    receive, from the mobile device via the encrypted wireless channel, an instruction set indicative of vehicle drive capability settings based at least in part on one or more user selected options for vehicle control or access; and
    instruct, based at least in part on the instruction set, the one or more vehicle actuators to limit:
      a driving distance;
      a driving time;
      a geographic region in which the vehicle is capable of being driven;
      an amount of steering control; and
      a maximum driving speed.

12. The system according to claim 11, wherein the vehicle actuators comprise one or more mechanisms for vehicle access comprising:
  a door lock actuator;
  a trunk hatch actuator; and
  a glove box lock actuator.

13. The system according to claim 11, wherein the vehicle actuators comprise one or more actuators for vehicle operation comprising:
  an ignition control actuator;
  an acceleration actuator;
  a steering control actuator; and
  a drive gear controller.

14. The system according to claim 11, wherein limiting the geographic region in which the vehicle is capable of being driven comprises:
  accessing a global positioning system (GPS) system to retrieve a GPS coordinate set associated with a current position of the vehicle;
  determining that the GPS coordinate set is not a member of a set of coordinates associated with a boundary of the geographic region in which the vehicle is capable of being driven; and
  controlling a drive function responsive to determining that the GPS coordinate set is not a member of the set of coordinates associated with the geographic region in which the vehicle may be driven.

15. A computer-implemented method comprising:
  establishing an encrypted channel between with a mobile device using a telematics control unit associated with a vehicle;
  receiving, via the encrypted channel and based at least in part on one or more user selected options, an instruction set indicative of vehicle drive capability settings; and
  changing, based at least in part on the instruction set, one or more drive capabilities of the vehicle, wherein changing the one or more drive capabilities comprises:
    limiting a driving distance;
    limiting a driving time;
    limiting a geographic region in which the vehicle is capable of being driven;
    limiting an amount of steering control; and
    limiting a maximum driving speed.

16. The computer-implemented method of claim 15, wherein limiting the driving distance comprises:
  accessing a global positioning system (GPS) system to retrieve a coordinate set associated with a current position of the vehicle;
  determining that the GPS coordinate set is not a member of a set of coordinates associated with a boundary of the geographic region in which the vehicle is capable of being driven; and
  responsive to determining that the GPS coordinate set is not a member of the set of coordinates associated with the geographic region in which the vehicle may be driven:
  transmitting a signal to an acceleration actuator that changes a vehicle speed.

17. The computer-implemented method of claim 16, wherein limiting the driving distance further comprises:
  transmitting a signal to an ignition key lock-out actuator that disables the ignition key lock-out actuator.

18. The computer-implemented method of claim 15, further comprising changing one or more vehicle access options comprising one or more of:
  allowing entry to the vehicle using a door lock actuator;
  allowing access to a locked trunk storage compartment using a trunk hatch actuator; and
  allowing access to a locked glove box storage compartment using glove box lock actuator.

19. The computer-implemented method of claim 18 wherein the vehicle access options are associated with a window of time during which access is granted.

20. The computer-implemented method of claim 15, further comprising limiting vehicle operation using an ignition key lock-out actuator, wherein operation of the vehicle is limited to a user-selected window of time during which vehicle operation is permitted.

* * * * *